INVENTORS,
PETER BROWN
GERALD CARP
BY
*Harry M. Saragovitz*
ATTORNEY

United States Patent Office

2,858,448
Patented Oct. 28, 1958

2,858,448

RADIATION DETECTOR SYSTEM

Peter Brown, Little Silver, and Gerald Carp, Wanamassa, N. J., assignors to the United States of America as represented by the Secretary of the Army Application March 5, 1957, Serial No. 644,186

4 Claims. (Cl. 250—83.3)

(Granted under Title 35, U. S. Code (1952), sec. 266)

The invention described herein may be manufactured and used by or for the Government for governmental purposes, without the payment of any royalty thereon.

This invention relates to instrumentation apparatus for the field measurement of radiation and more specifically to the gamma radiation rate from radioactive fallout.

A need for a radiation measuring device of this type which will cover a wide dynamic range, be entirely self-contained and be substantially insensitive to external conditions other than the radiation it is intended to measure has existed for some time. Previously photomultiplier tubes connected in feedback amplifier circuits have been used with some degree of success. These circuits have been subject to zero drift due to variations in the dark current of the photomultiplier tube and require the use of a high voltage source for the photomultiplier tube. These features present rather serious problems in an instrument designed for field use.

It is an object of the present invention to provide a field radiation measuring instrument of relatively simple circuitry capable of operation over a wide dynamic input range.

It is a further object of the invention to provide a field instrument operated entirely from low voltage power supplies and insensitive to changes in external conditions other than the radiation it is intended to measure.

It is a still further object of the invention to vary the output frequency of an oscillating circuit as in response to incident radiation to obtain a measure of the intensity and integrated dosage of such radiation.

Figure 1:
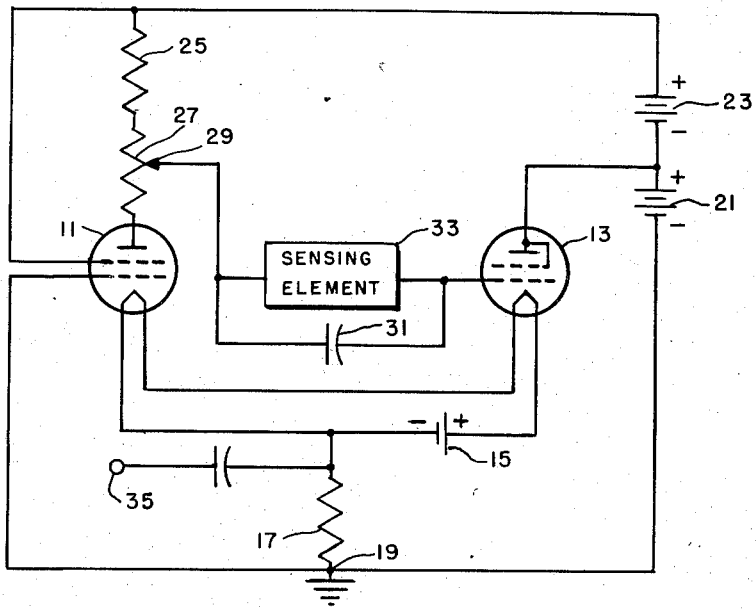
Figure 2:
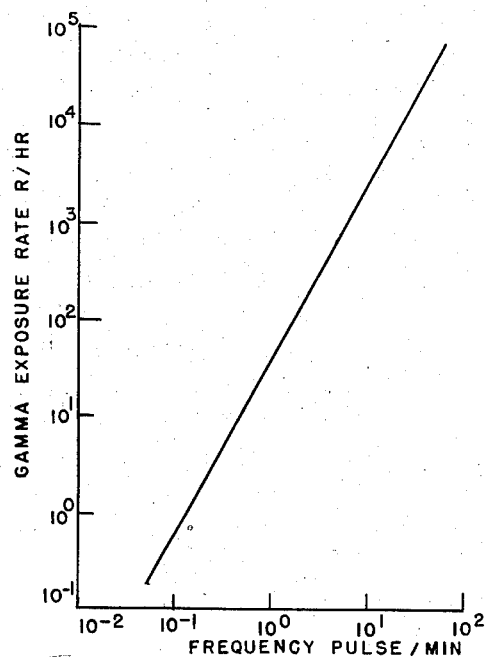

Other objects and many attendant advantages of the invention will become readily apparent as the same becomes better understood from the following deailed description and the accompanying drawings, wherein:

Fig. 1 is a schematic diagram of a circuit constructed in accordance with the principles of the invention, and Fig. 2 is a typical calibration curve of a circuit such as that of Fig. 1 showing the operation and range of the system, and its freedom from temperature and drift errors.

Referring now to Fig. 1 it will be apparent that the basic circuit shown is of the multivibrator type. The multivibrator utilizes a pair of electron tubes 11 and 13 illustrated as of the battery operated tetrode type. The filament elements of the tubes are connected in series across a source of voltage illustrated as a battery 15 and are connected through a common cathode resistor 17 to a grounded terminal 19. The cathode resistor 17 is tied at its ungrounded end to the negative terminal of the filament source 15. The control grid of tube 11 is connected directly to the grounded terminal 19.

The tube 13 has a plate potential applied thereto by means of a battery 21 connected between the grounded terminal 19 and the plate of the tube. The screen grid of tube 13 is connected directly to the plate for triode operation of the tube. The tube 11 has a plate potential applied thereto from the battery 21 and a further battery 23 series connected from the positive terminal of battery 21 through a plate resistor 25 and a potentiometer resistor 27 to the plate of the tube. The screen grid of tube 11 is connected directly to the positive terminal of the battery 23. A movable tap 29 on the potentiometer resistor 27 is connected through a condenser 31 in parallel with a sensing element 33 to the control grid of tube 13.

The sensing element 33 may be any element in which the output current therethrough is proportional to the radiation incident thereon. Thus, for example, ion chambers, scintillation detectors or photoconductive crystals known to the prior art may be utilized. The essential factor of the sensing device is that it changes its conductivity with the condition that is to be measured as will become more apparent in the description of the operation of the system hereinafter. The particular sensing device chosen will of course depend upon the characteristics of the radiation to be measured. An unsaturated ion chamber has been used for incident gamma radiation ranging from one tenth to one hundred thousand roentgens per hour.

The value of condenser element 31 may be chosen in accordance with the type of sensing element used and the incident radiation. This relationship will be more fully described in connection with the operation of the system.

The output of the system may be taken at an output terminal 35 condenser coupled as shown to the ungrounded end of cathode resistor 19.

The incident radiation is to be measured in terms of the frequency of operation of the multivibrator circuit. A typical operation of the system will therefore be described. Initially when power is applied to the multivibrator system (through switches not shown) tube 13 will conduct passing current through the cathode resistor 19 which applies a negative bias to tube 11 to hold it in the nonconductive state. Condenser 31 will charge from the source made up of batteries 21 and 23 through the grid-filament path of tube 13 and the cathode resistor 19. When the condenser 31 is fully charged, tube 13 will cease to conduct and tube 11 will lose its negative bias and become conductive.

The system is now ready for its measuring operation. The charge stored on condenser 31 is holding tube 13 non-conductive. The sensing element 33 forms a discharge path for the condenser 31 and the conductivity of the discharge path is determined by the incident radiation falling on the sensing element. The stored charge will therefore be dissipated at a rate dependent upon the conductivity of the sensing element. When the condenser charge has dropped sufficiently to cause the potential of the grid of tube 13 to reach its critical level, tube 13 will again become conductive to render tube 11 non-conducting. The above cycle repeats at a frequency determined by the intensity of the incident radiation.

It can be shown that the frequency of repetition is given by $$f = KR^{\frac{1}{N}}$$

where $f$ is the pulse repetition rate, $R$ is the radiation rate and $K$ and $N$ are parameters determined by the circuit elements. The valve of $K$ is determined by both the capacity of the condenser 31 and the setting of the tap 29 on the potentiometer 27 in the plate circuit of tube 11. The value of $N$ is determined by the response of the sensing element 33. Leakage (discharge of the condenser 31 in the absence of radiation) places a lower limit on the output frequency of the detector.

An unsaturated ion chamber has an output current proportional to the square root of gamma radiation thereon. $N$ in the above equation becomes 2 and $$f = K\sqrt{R}$$

A saturated ion chamber, if used, has an output current directly proportional to the radiation and the equation becomes $$f = KR$$

Other sensing devices change the frequency response equation dependent upon their particular characteristics.

The current flow through a saturated ion chamber is not dependent upon the voltage existing across the chamber but only on the radiation falling thereon. The voltage across the condenser will therefore decay at a substantially linear rate rather than exhibiting the normally expected exponential characteristic. Since the slope of the voltage decay curve is constant and does not tend to become parallel to the critical grid voltage line the frequency control effect of the saturated ion chamber is particularly good. The time of firing is sharply defined and is not materially affected by shifts in circuit levels.

The unsaturated ion chamber current flow is dependent upon the voltage existing across it and the voltage decay does exhibit exponential characteristics. The frequency control obtainable with this type of chamber is however remarkably good.

Adjustment of the potentiometer tap 29 and selection of the value of the capacity of condenser 31 may be used to obtain a readily measurable frequency for the radiation to be measured.

The output frequency may be measured by any known device connected to the output terminals. Recording meters have been used with good results. A count of the number of output pulses will give the integrated dosage over any interval of recording when a linear sensing element is used.

Typical circuit components which have been used in the construction of a circuit such as illustrated in Fig. 1 are:

| | | |
|---|---|---|
| Tube 11 | | CK512AX |
| Tube 13 | | CK512AX |
| Battery 15 | volts | 1.5 |
| Resistor 17 | ohms | 22,000 |
| Battery 21 | volts | 22.5 |
| Battery 23 | do | 22.5 |
| Resistor 25 | ohms | 100,000 |
| Potentiometer 27 | do | 50,000 |
| Condenser 31 | micromicrofarads | 5-10 |

The sensing element 33 utilized in this typical circuit was an unsaturated ionization chamber formed of a right cylinder of polystyrene with an internal diameter of one and three quarters inches and a height of one and three quarters inches. The inner wall and top of the cylinder were coated with aquadag to form one electrode and the other electrode was formed of an aluminum rod having a spherical tip of one sixteenth inch diameter located at the center of the cylinder. The remainder of the rod was incased in a polystyrene tube of approximately one eighth inch diameter leaving only the tip exposed. The cylinder was filled with dry air at atmospheric pressure.

The above values are intended as illustrative rather than limiting and it will be readily apparent that components other than those listed could be used.

Fig. 2 illustrates the response characteristics of the circuit of Fig. 1 with an unsaturated ion chamber connected as the sensing element 33. The operating circuit frequency in pulses per minute has been plotted against the incident radiation in roentgens per hour. It will be noted that the instrument covers a range of six decades of radiation intensity without circuit switching of any sort and without changes in response characteristics over this range. The system has been checked for response at spaced time intervals and at different ambient temperatures with remarkably little variation in output readings.

It will of course be apparent that the invention is not limited to the exact embodiment described. Other modifications will suggest themselves from the above teachings and the scope is to be determined solely by the appended claims.

What is claimed is:

1. A wide range radiation detector circuit comprising a pair of electron discharge devices adapted to be connected to a source of power through a common cathode resistor, a condenser connected from the anode of one of said electron discharge devices to the control grid of said other electron discharge device and means including a device whose conductivity varies with radiation incident thereon connected across said condenser to establish a variable time constant circuit for controlling the operational frequency of said electron discharge devices.

2. A wide range radiation detector system according to claim 1 wherein said device whose conductivity varies with radiation incident thereon is an unsaturated ion chamber.

3. A wide range radiation detector system according to claim 1 wherein said device whose conductivity varies with radiation incident thereon is a saturated ion chamber.

4. A wide range radiation detector system according to claim 1 wherein said device whose conductivity varies with radiation incident thereon is a photoconductive crystal.

References Cited in the file of this patent

UNITED STATES PATENTS 2,383,478     Friedman     Aug. 28, 1945